Dec. 10, 1968   J. W. McGOWAN, JR   3,416,070
METHOD AND APPARATUS FOR SENSING GASES
Original Filed June 5, 1964   3 Sheets-Sheet 1

INVENTOR.
James W. McGowan, Jr.
BY
Philip S. Hilbert
ATTORNEY

Dec. 10, 1968   J. W. McGOWAN, JR   3,416,070
METHOD AND APPARATUS FOR SENSING GASES
Original Filed June 5, 1964   3 Sheets-Sheet 3

United States Patent Office 3,416,070
Patented Dec. 10, 1968

3,416,070
METHOD AND APPARATUS FOR
SENSING GASES
James William McGowan, Jr., 810 Crest Road,
Del Mar, Calif. 92014
Continuation of application Ser. No. 372,984, June 5,
1964. This application Mar. 8, 1968, Ser. No. 711,811
30 Claims. (Cl. 324—33)

ABSTRACT OF THE DISCLOSURE

Apparatus for detecting leaks in a vacuum system; the operation thereof being based on the fact that some gases, e.g. helium, rapidly pass through small leaks in a vacuum system and that these gases can be effectively exicted by electron impact to a specific metastable state; the thus excited atom, which is unaffected by electric fields, can then drift to a collector for detection. However, ions and electrons which exist in the apparatus in large numbers, are effectively eliminated by electric fields. Such apparatus with collectors of different materials, permits identification of certain gases.

---

This application is a continuation of application Ser. No. 372,984, filed June 5, 1964, now abandoned.

Although there may be a number of instances where it may be necessary to detect the presence of a gas, such sensing procedures are particularly important when leaks, particularly those of minute size are to be located. Mass spectrometers have been found to be particularly useful for the purpose and can make precise and sensitive measurements in leak detector operations. However, such apparatus is bulky and relatively expensive.

Accordingly, an object of this invention is to provide an improved method for sensing the presence of a selected gas in a given region, which utilizes equipment of compact size, such equipment being relatively economical in cost.

Another object of this invention is to provide an improved method of detecting leaks in a system.

It is also an object of this invention to provide an improved method and apparatus for generating an electric current in response to the presence of a selected gas in a given region.

Other objects of this invention will in part be obvious and in part hereinafter pointed out.

The instant invention contemplates the excitation of particles of a gas to metastable states of given energy and the interaction of such metastable excited gas particles with a collector which is connected to a source of electrons. The collector has a work function which has a given relationship with respect to the metastable excited gas particles. In some, but not all cases, the work function is less than the available metastable energy of the gas particles. In such case, when a metastably excited gas particle interacts with the collector, electrons are removed therefrom. The electrons which are liberated have a kinetic energy which, at maximum, is the difference between the energy contained in the metastable particle and the work function. As each electron is removed, an electron is drawn from the source of electrons to replace the same. Accordingly, an electric current is established, which current flows from the source of electrons to the collector.

The gas particles may be in either atomic or molecular form. A collector, as herein mentioned is a surface material which can liberate electrons and which can replace the liberated electrons by other electrons from a source of electrons to which it is connected. The current flow from the source of electrons to the collector is related directly to the number of metastables striking it.

With the broad method of the invention achieved, the same may be applied to detect the presence of selected gases whose particles may be metastably excited, and further, may thus be utilized to detect leaks.

Figure 1:
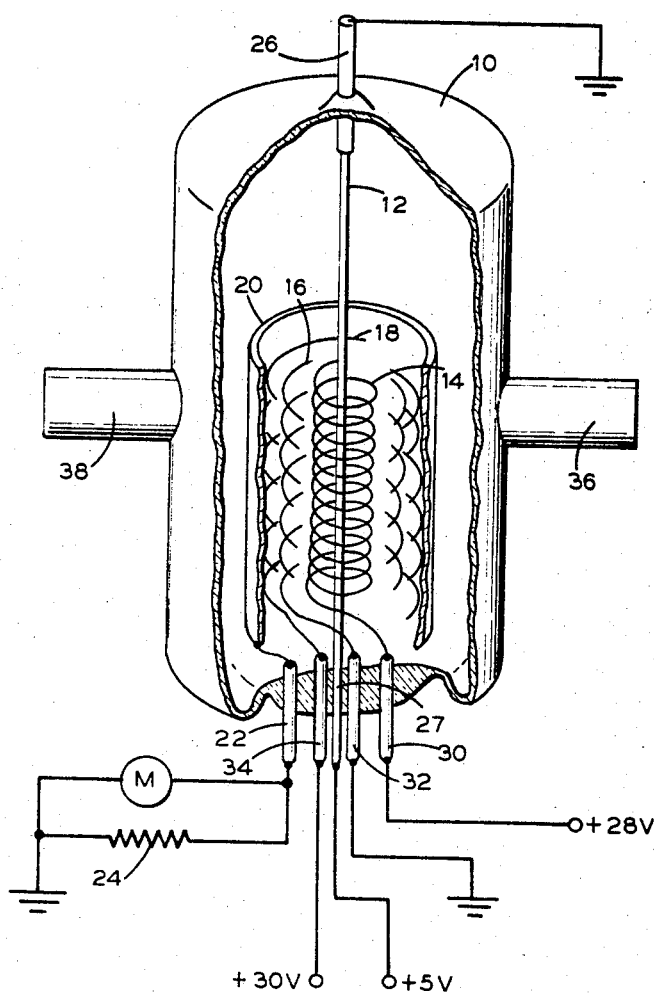
FIG. 1 is a front elevational view, with parts broken away, of an apparatus for generating an electric current in accordance with one embdiment of the invention.

FIG. 1 shows one embodiment of the invention which is useful for generating an electric current which may be used for detecting the presence of a certain gas or gases. The gas detecting device comprises an envelope 10 of an insulative material such as glass, which envelope houses a plurality of electrical elements. Thus, the envelope in substantially cylindrical form has mounted therein a cathode 12 which through resistive heating boils off electrons. Cathode 12 is fixed along the major axis of envelope 10. Concentrically disposed about cathode 12 is a first electrode 14 which acts as an electron accelerating means.

Electrode 14 is shown as a helical wire, although the same may take the form of a gridlike cylinder of wire mesh which is mechanically permeable to gas particles, electrons and ions. Concentrically disposed about electrode 14 is an electrode 16, also in helix form, which acts as an electron repeller element, electrode 16 being similar structurally to electrode 14. Electrode 16 is effective to optimize the operation of the device.

An electrode 18, also in helix form, is concentrically disposed about electrode 16, and functions as an ion repeller element; being similar as to structure to electrodes 14 and 16. A cylindrical collector electrode 20 is concentrically disposed about electrode 18. Collector 20 is formed of a material adapted to donate electrons when interacted with metastably energized gas particles, that is, the work function of the surface is less than the energy in the metastable level.

A sealed feed through 22 is connected to one end of a resistor 24, the other end of which is connected to ground to provide a source of electrons, the feed through being also connected to collector 20. Cathode 12 is connected via sealed feed through 26 and 27 to a +5 volt source of potential. In this manner a current is forced through cathode 12 which heats it and starts boiling off electrons.

Sealed feed through 30 connects electrode 14 to a 28 volt source of positive potential. Electrode 16 is grounded via seal through 32 while sealed feed through 34 connects electrode 18 to a 30 volt source of positive potential. A gas inlet 36 and a gas outlet 38 extend from envelope 10. In some cases, the gas outlet 38 may not be required.

The device operates as follows: A gas having particles which can be metastably energized is introduced into envelope by way of inlet 36 and passes out by way of outlet 38. At this time, electrons boiled off from cathode 12 are accelerated radially outward by electrode 14 and in the course of their flight they collide with the particles of the gas. The collisions will give rise to metastable particles of the gas which are electrically neutral in addition to charged particles.

It is now necessary to make certain that only gas particles in metastable states reach the collector 20, for reasons hereinafter appearing. Accordingly, cathode 12 is biased to a higher potential than that of collector 20, so that electrons will flow back to cathode 12. Electrode 18 which is at a potential higher than that of cathode 12, also repels positive ions back toward cathode 12 and electrodes 14 and 16 and recombinations take place.

To enhance this charged particle filtering action, electrode 16 is maintained at a potential less than that of electrodes 14 and 18. In the absence of electrode 16, electrons would oscillate back and forth about electrode 18. Any ionization collisions occurring in the region between collector 20 and electrode 18 would generate positive ions which would be picked up by collector 20. Accordingly, electrode 16 is effective to set up a strong repelling field for the electrons to insure a minimum of electron oscillations about electrode 18 and a maximum of such oscillations about electrode 14 so that the collision region is on the side of the repeller electrode 18 remote from collector 20.

Since the metastable gas particles are electrically neutral, their passage is essentially unopposed except by the grids and they can move toward the surface of collector 20. If the metastable energy of the gas particle is at least equal to the work funcion of the collector 20, then when the metastable particle contacts the surface of collector 20, it will cause an electron to be ejected from the surface of collector 20 and will be drawn toward the repeller electrode 18. Thus, electrode 18 also serves to prevent an electron space charge from building which would limit the electron flow from the surface of collector 20.

As each electron is liberated, collector 20 draws an electron from ground via resistor 24, to replace the liberated electron. The flow of electrons from ground through resistor 24 provides a generated electrical current. The magnitude of such current is measured by meter M. It will now be seen that it is undesirable for electrons from the source of electrons or ions formed by electron collision in the gas to impinge on the surface of collector 20 because any charged particles reaching the collector 20 would generate "noise" current.

Figure 2:
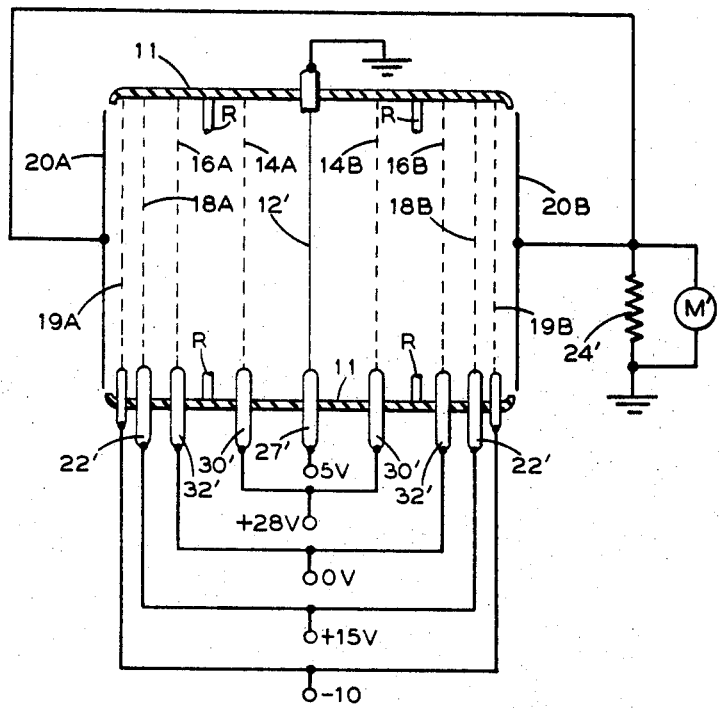
FIG. 2 is a view showing a modified form of the device shown in FIG. 1.

The device shown in FIG. 2 illustrates another embodiment of the invention and which is similar to that shown in FIG. 1, except as hereinafter pointed out. The elements 12, 14, 16, 18 and 20 of the device of FIG. 1, find their counterparts as cathode 12′, electrodes 14A, 14B; 16A, 16B; 18A, 18B; and collectors 20A, 20B. Thus, whereas the electrodes 14, 16, 18 and collector 20 are in cylindrical form, their counterpart electrodes are essentially paired planar screens symmetrically related to cathode 12′. The electrodes 14A, 14B; 16A, 16B and cathode 12′ are located between casing members 11 which are spaced by suitable rods R and which are open at opposite sides defined by electrodes 18A, 18B. Casing 11 provides shield means for the plate collectors 20A, 20B disposed opposite electrodes 18A, 18B, against electrons and ions. The region beyond electrodes 18A, 18B is open so that gas may flow into the energizing region of the device. The connections to various potential sources and to ground, for the several electrodes, the cathode and collectors, is similar to that of FIG. 1. According to another feature of the invention, further electrodes 19A, 19B are disposed between respectively collector 20A and electrode 18A, and collector 20B and electrode 18B. Electrodes 19A, 19B are connected to a −10 volt potential and provide a metastable energy filter.

It will be recalled that the energy of the liberated electrons is effectively the difference between the energy of the metastable particle and the work function of the collector. Therefore, if there are two different kinds of metastable particles each with a different metastable energy and both liberate electrons from the collectors 20A, 20B, the liberated electrons will fall into two different groups with each group having a different energy. If the potential of electrodes 19A, 19B is chosen to provide a potential barrier to the low-energy liberated electrons but not the high-energy liberated electrons, low-energy liberated electrons will be driven back to the collectors 20a and 20b to subtract from the generated current. However, the high-energy liberated electrons will pass over the potential barrier. Accordingly, the high energy electrons are the only electrons contributing to the measured current. Therefore, the measured current is an indication of the number of high energy metastable particles.

Figure 3:
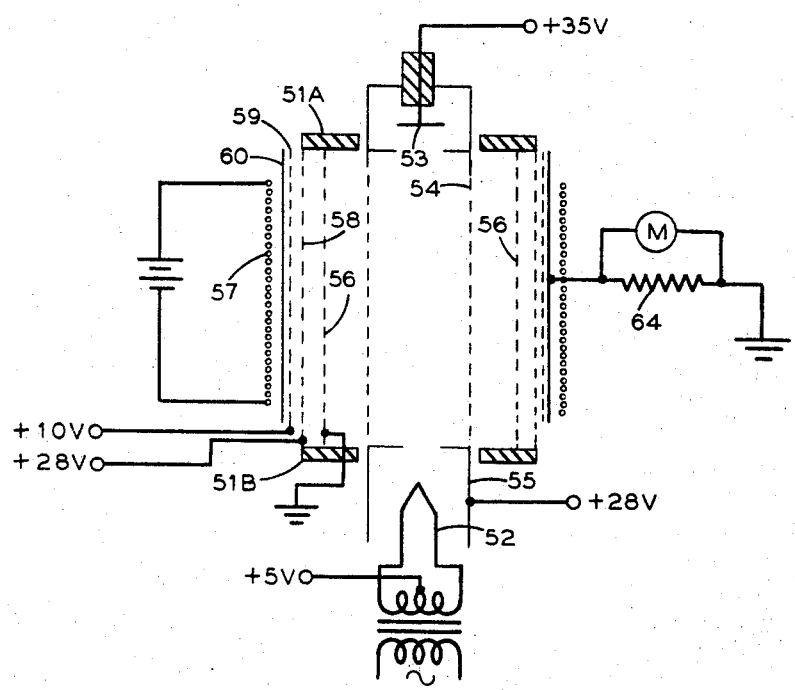
FIG. 3 shows still another embodiment of the invention.

FIG. 3 shows another embodiment of the invention wherein the several elements are of cylindrical form. The cylindrical gridlike electrodes 54, 56, 58 and 59 are disposed between circular insulating end walls 51a, 51b. Rodlike supports, not shown, maintain the end walls 51a, 51b at a given spacing. A heated cathode 52 is located below a central opening in an apertured shield 55 maintained at a +28 volt potential and disposed in end wall 51b to provide a source of energizing electrons. Cathode 52 is biased to a +5 volt potential.

A plate 53 is located opposite a central opening in end wall 51a, said plate 53 being in axial alignment with cathode 52 and at a +35 volt potential. A solenoid 57 is wound about the assembly so as to provide an axial magnetic field when said solenoid is energized. Cathode 52, shield 55, plate 53 and solenoid 57 suitably energized, cooperate to form an electron gun and target system wherein electrons from cathode 52 travel in helical paths about the central axis of the device to plate 53. Electrode 55 electrically and mechanically connected to grid 54, is at a +28 volt potential to accelerate the electrons boiled off cathode 52 to cause their collision with gas particles. Electrode 56 which is connected to ground, acts as an electron repeller while electrode 58 acts to repel positive ions and to attract liberated electrons. Electrode 58 is connected to a +28 volt source. Electrode 59 connected to a −10 volt source acts as an energy filter in the same manner as electrodes 19a and 19b operate for the device of FIG. 2. Collector 60 which is connected via resistor 64 to ground which provides a source of electrons, operates in the manner described for collectors 20 and 20′.

With the device shown in FIG. 3, the collision path is of increased length, there is a reduced likelihood of electrons reaching the surface of collector 60 and the energizing electrons are within a narrower range of energies.

Figure 4:
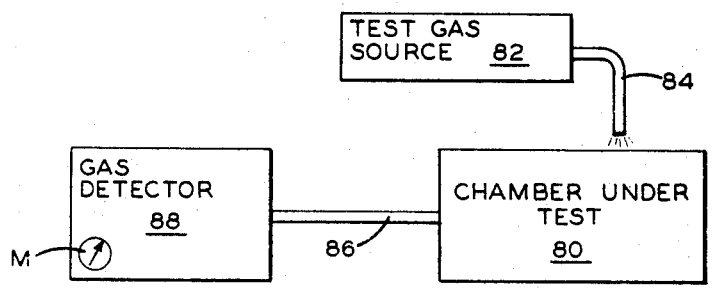
FIG. 4 is a schematic diagram showing one method of detecting leaks in an evacuated chamber in accordance with the invention.

FIG. 4 shows one method for detecting a leak in a chamber. Thus chamber 80 under test, is connected via a conduit 86 to a gas detector 88. Detector 88 may take the form of any one of the devices shown in FIGS. 1–3. A test gas which can be excited to metastable states from a source 82 is dispensed by a flexible conduit 84 about the outer surface portions of chamber 80 and particularly in the region of seals or seams therein. If there is any leak in chamber 80, the test gas will enter the same and pass outwardly thereof by way of conduit 86 into leak detector 88. The presence of such gas will be detected, in the manner previously described, causing a current to flow and to register on meter M which will be deflected from its quiescent position.

Figure 5:
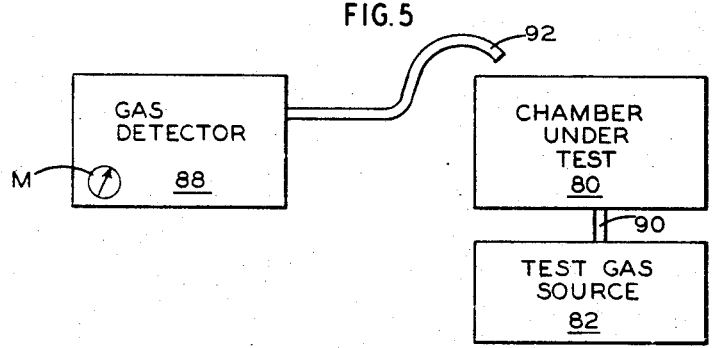
FIG. 5 is a schematic diagram showing another method of detecting leaks in a chamber in accordance with the invention.

Alternatively, leaks may be detected in the manner illusrtated by FIG. 5. Here, metastably excitable test gas from source 82 is passed into chamber 80 undergoing test, by way of conduit 90. A gas collector or sniffer 92 is passed over the exterior surface of chamber 80, particularly in the region of seals or seams, and any leaking gas will be collected by sniffer 92 and passed to detector 88, giving rise to an electric current which registers on meter M.

The devices disclosed herein are highly effective when the test gas is helium. Neon and argon may also be used. Helium is preferred since it occurs in the atmosphere in extremely minute quantities, and in lesser proportions than argon for example. The energies of helium metastables is of the order of 20 electron volts so that the electrons liberated normally have high kinetic energy requiring little field to draw them from the collector. The metastable levels of other atmospheric gases are considerably lower so that electrons liberated by these metastables have proportionally less kinetic energy than do those from helium metastables. A low draw out field from elements 58 or 18 thus discriminates against other metastables. The discrimination is enhanced when electrodes such as electrodes 19a and 19b and electrode 59 are employed.

To further discriminate against inaccuracies introduced by common atmospheric gases, it is desirable to make the collectors 20, 20', 60 of surface materials having a relatively high work function, such as platinum, nickel, gold or silver. Helium gas and a platinum surface collector provides a good combination. However, other combinations of gas and metal may be used, providing the metastable energy of the gas particle is greater than the work function of the collector surface. It should be noted that energy filter electrodes such as 19a and 19b and 59 broaden the range of possible combinations that provide the required discrimination.

Figure 6:
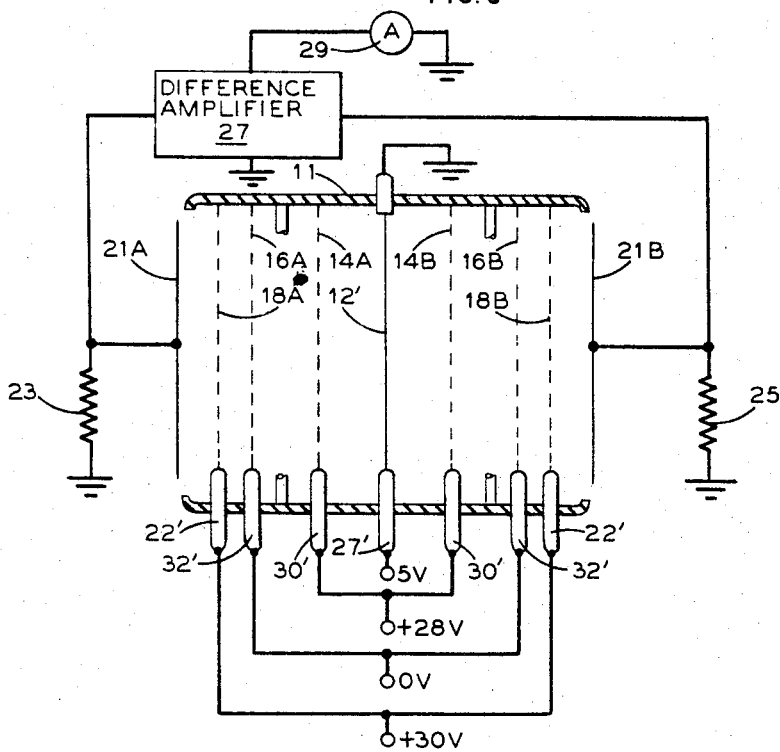
FIG. 6 is a front elevational view, with parts broken away, and including schematic representations of apparatus for detecting a particular gas in a mixture of gases.

FIGURE 6 shows a metastable spectrometer or apparatus for detecting a particular gas within a mixture of gases. The operation of such apparatus depends on the fact that the particular gas has a metastable state of given energy such as E. The metastable particles containing energy E can cause the removal of electrons from a collector surface having a work function $E_1$ which is less than E but cannot cause the removal of electrons from a collector surface having a work function $E_2$ which is greater than E. Accordingly, if a mixture of gases is metastably excited and the metastable particles allowed to react with collector surfaces having the above described different work functions, the presence of the particular gas can be detected by measuring for a difference in the current flow to both collectors. Provided no physical biases are present in the system, except the difference in work functions and the associated difference in secondary electron emission, the current flow to the collector with work function $E_1$ will be related to the number of gas particles $n_1$ in metastably excited states with energy $E \geq E_1$. Similarly, the current flow to a second collector having work function $E_2$ will be related to the number of gas particles $n_2$ in metastably excited states with energies $E \geq E_2$. Therefore, the difference in current flow from ground to these plates is related to the difference $n_2 - n_1$.

The apparatus of FIG. 6 is adapted to measure the effective number difference. This apparatus is similar to the apparatus of FIG. 2 except as indicated. Accordingly, the common structure will not be redescribed and only the differences are noted. Collector 21a has a surface with a work function $E_2$ greater than the work function $E_1$ of collector 21b. It should be noted that the modification of apparatus of FIG. 2 is by way of example. Similar modifications may be applied to the device of FIGS. 1 and 3 wherein the cylindrical collectors can be divided into two equal parts that are electrically insulated from each other, each of the parts having a surface with the different work functions $E_2$ and $E_1$.

In any event, collector 21a is connected to ground via resistor 23 and collector 21b is connected to ground via resistor 25. The voltage across resistor 23 is fed to one input of difference amplifier 27, of conventional design, and the voltage across resistor 25 is fed to the other input of the difference amplifier 27.

When the apparatus is in an atmosphere of gases under test, the gases are energized by electrons as described above. The metastable particles of the gas now contact the collectors 21a and 21b causing the above described current flow. Since the efficiencies for production of secondary electrons from two different surfaces with work functions $E_1$ and $E_2$ less than the metastable energy E is usually different, the resistors 23 nad 25 must be chosen such that the potentials developed across them are nearly equal. However, when $E_1 < E < E_2$ there is a potential developed across resistor 23 and not across resistor 25 which gives rise to an inbalance as measured on the ammeter 29 associated with the difference amplifier 27. Such an imbalance consequently indicates the presence of metastables with an energy between $E_2$ and $E_1$.

It is clear that the metastable spectrometer need not be limited to two different collector materials of different work functions. In practice, the spectrometer might have a multiplicity of different surfaces.

As various changes might be made in the embodiment of the invention herein shown with departing from the spirit thereof, it is understood that all matter herein described or illustrated is not limiting except as set forth in the appended claims.

I claim:
1. A method of detecting the presence of a given gas which can be excited to metastable states in a given region comprising bombarding said region with particles of high energy content to excite the gas particles in said region to at least metastable states of given energies, engaging said excited gas particles with the surface of a collector connected to a source of electrons and having a work function less than the magnitudes of said given energies whereby electrons are removed from the surface of said collector by said metastably excited gas particles and replaced by an electric current flow from said source of electrons to said collector and registering said current flow to indicate the presence of said given gas.

2. A method for detecting the presence of a particular gas in a mixture of metastably excitable gases in a given region comprising the steps of bombarding said region with particles of high energy content to excite the gas particles in the region to metastable states wherein the metastable energy of each of the gases is different, allowing the metastably excited gas particles to contact the surfaces of first and second collectors connected to a source of electrons the surface of said first collector having a work function which is less than the metastable energy of the particles of the particular gas and the surface of said second collector having a work function which is greater than the metastable energy of the particles of the particular gas whereby electrons are removed from the surfaces of said collectors and replaced by an electric current flow from said sources of electrons to said collectors, and measuring the difference in the current flow to said collectors to indicate the presence of the particular gas.

3. A method for detecting a given gas comprising the steps of passing the gas through a zone traversed by particles having high kinetic energy to excite the gas into metastably excited states, filtering out the particles, engaging a source of electrons by said metastably excited gas, and measuring the flow of electrons produced by said engagement.

4. A gas detector comprising an electron source, an electron anode displaced from said electron source, said source and anode defining an axis, means for accelerating electrons along said axis from electron source to said electron anode, a first electrode disposed about said axis, a second electrode disposed about said first electrode, a third electrode disposed about said second electrode, a collector disposed about said third electrode, means for connecting said collector to a source of electrons, means for maintaining said first electrode at a potential greater than that of said electron source, means for maintaining said second electrode at a potential less than that of said first electrode, means for maintaining said third electrode at a potential gerater than that of said second electrode and of said collector, an envelope of non-porous material encompassing said electron source, anodes and said eletrodes, means for establishing a magnetic field colinear with said axis and means for introducing a gas into said envelope.

5. A device as defined in claim 4 wherein the nonporous material is glass.

6. The gas detector of claim 4 further comprising a fourth electrode disposed about said third electrode and means for maintaining said fourth electrode at a potential less than that of said collector.

7. A gas detector comprising an envelope, a cathode within said envelope, a first electrode in displaced relation to said cathode, a second electrode in displaced relation to said first electrode, and remote from said cathode, a third electrode in displaced relation to said second electrode and remote from said first electrode, first and second collectors displaced from said third electrode and remote from said second electrode, the surfaces of said collectors having different work functions, means connecting said collectors to a source of electrons, means for maintaining said cathode at a potential greater than that of said collectors, means for maintaining said first electrode at a potential greater than that of said cathode, means for maintaining said second electrode at a potential less than that of said first electrode, means for maintaining said third electrode at a potential greater than that of said second electrode and said collectors and means for introducing a gas into said envelope.

8. A gas detector comprising an envelope, means in said envelope for producing a zone of particles having a high kinetic energy, means for passing a gas into said envelope and through said zone to excite the gas into at least one metastably excited state, an electron source spaced from said means for producing the high energy particles, and filtering means between said source and the means for producing the high energy particles to filter the high energy particles from the source.

9. A device as defined in claim 8 further including means for exhausting the gas from the envelope.

10. A device as defined in claim 8 further including means connected to the electron source for measuring the flow of electrons therein.

11. A device as defined in claim 8 wherein the means for producing the zone of high kinetic energy particles comprises a cathode, an anode spaced from said cathode, and means secured to said anode and cathode for connection to a source of electrical energy.

12. A device as defined in claim 11 wherein the cathode comprises a conductor and the anode comprises a shield permeable to gas particles surrounding the cathode.

13. A device as defined in claim 10 wherein the shield is a helical wire.

14. A device as defined in claim 11 wherein the anode comprises a plate and the cathode comprises a heater axially spaced therefrom.

15. A device as defined in claim 12 wherein the filtering means comprises a first electrode surrounding the shield and a second electrode surrounding the first electrode.

16. A device as defined in claim 15 wherein the electron source comprises a collector surrounding the second electrode.

17. A device as defined in claim 16 wherein said collector has a surface of platinum.

18. A device as defined in claim 16 wherein said collector has a surface of nickel.

19. A device as defined in claim 16 wherein said collector has a surface of gold.

20. A device as defined in claim 16 wherein said collector has a surface of silver.

21. A device as defined in claim 16 further including means applying a positive potential to the anode and second electrode and means applying a lower potential to the collector and first electrode.

22. A device as defined in claim 11 wherein the anode comprises a pair of planar shields permeable to gas and the cathode comprises a conductor between the shields.

23. A device as defined in claim 22 wherein the filtering means comprises a first pair of electrodes adjacent the pair of shields and a second pair of electrodes adjacent the first pair of electrodes.

24. A device as defined in claim 23 wherein the electron source comprises a pair of plates spaced from the second pair of electrodes.

25. A device as defined in claim 24 further including a third pair of electrodes between the second pair of electrodes and the plates.

26. A device as defined in claim 25 wherein the plates have a surface of a material selected from the group consisting of platinum, nickel, gold and silver.

27. A device as defined in claim 25 further including means applying a positive potential to the anode and second electrodes, means applying a negative potential to the third electrodes, and means applying a common potential between said aforementioned positive and negative potentials, to the pair of plates and first pair of electrodes.

28. A device as defined in claim 27 further including means connected to the plates for measuring the flow of electrons therein.

29. A device as defined in claim 24 wherein one of the plates has a work function greater than the other of the plates and further including a difference amplifier, means connecting each plate to an input of said amplifier, and means for measuring the current output of the amplifier.

30. A device as defined in claim 14 wherein the filtering means comprises three concentric electrodes and the electron source comprises a collector surrounding the outermost electrode, a solenoid surrounding the collector, and means applying a positive potential to the two outermost electrodes and means applying a lower potential to the collector and innermost electrode.

References Cited

UNITED STATES PATENTS

| | | | |
|---|---|---|---|
| 2,516,704 | 7/1950 | Kohl | 324—33 X |
| 2,963,601 | 12/1960 | Varnerin et al. | 324—33 X |
| 3,001,128 | 9/1961 | Nottingham | 324—33 |
| 3,126,512 | 3/1964 | Zito | 324—33 |
| 3,267,326 | 8/1966 | Hayward et al. | |
| 3,271,731 | 9/1966 | Adler et al. | 313—7 X |

RUDOLPH V. ROLINEC, *Primary Examiner.*

C. F. ROBERTS, *Assistant Examiner.*

U.S. Cl. X.R.
313—231; 315—111